Dec. 21, 1954  D. GIACOSA  2,697,613
LEAF SPRING SUSPENSION FOR MOTOR VEHICLES
Filed July 14, 1953
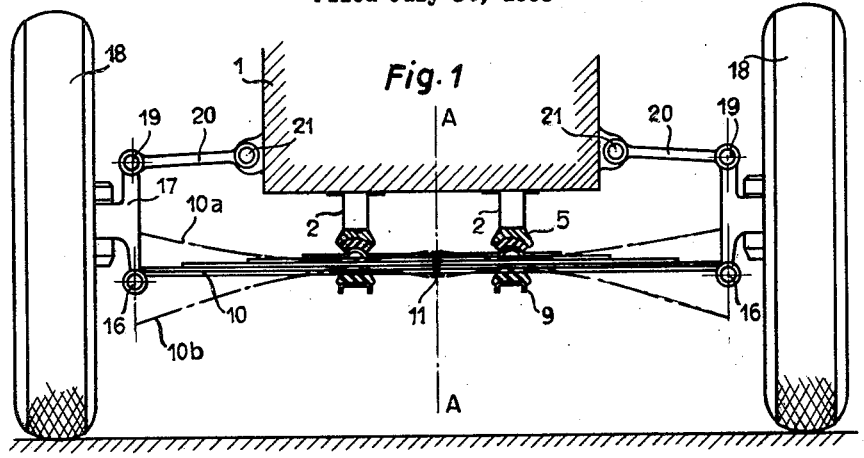
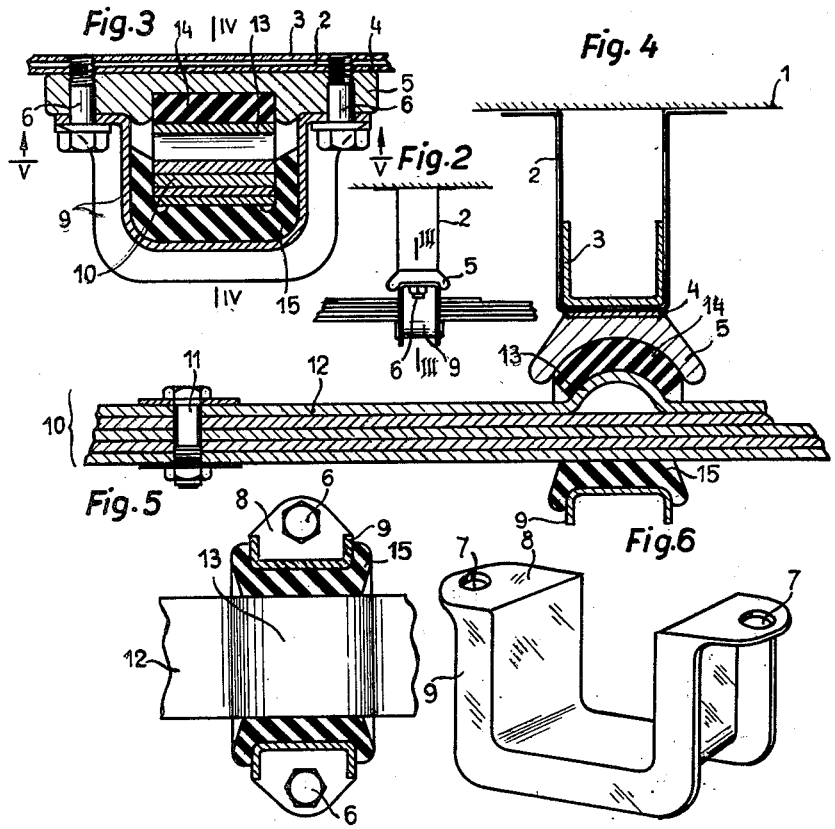

United States Patent Office 2,697,613
Patented Dec. 21, 1954

2,697,613

LEAF SPRING SUSPENSION FOR MOTOR VEHICLES

Dante Giacosa, Turin, Italy, assignor to Fiat Societa per Azioni, Turin, Italy

Application July 14, 1953, Serial No. 367,881

Claims priority, application Italy July 23, 1952

3 Claims. (Cl. 280—124)

This invention relates to independent wheel suspensions for motor vehicles of the type embodying a transverse articulated parallelogram, in which one of the horizontal sides of the suspension quadrilaterals for two opposed wheels is formed by the end of one transverse leaf spring.

In known suspensions of this type, the spring is rigidly connected at its central portion to the frame. Consequently, as each of the two spring sections behaves like a clamped one-quarter elliptic spring, highly flexible suspensions cannot be obtained on account of the reduced free bending length.

It is the object of this invention to avoid these drawbacks by providing a suspension embodying a transverse parallelogram, in which the leaf spring forming one of the horizontal sides of the two quadrilaterals is connected to the frame by two attachments behaving like hinges instead of as clamps, whereby the full leaf spring length is utilised for suspension.

This is obtained according to this invention by symmetrically arranging on both sides of the longitudinal central plane of the vehicle attachments between the leaf spring and frame such as to admit sliding displacements between the spring leaves and the slight transverse displacements necessary to permit bending of the spring and such as to absorb at the same time both stresses directed transversely and longitudinally of the vehicle. The spring leaves are simply connected together at the middle by bolt or the like.

Further features of this invention will be understood from the following description referirng to the accompanying drawing which shows merely by way of example and embodiment thereof.

Figure 1 is a part sectional front view of an improved suspension;

Figure 2 is a front view on an enlarged scale of one of the attachments for the leaf spring shown in Figure 1;

Figure 3 is a sectional view on line III—III of Figure 2;

Figure 4 is a sectional view on line IV—IV of Figure 3;

Figure 5 is a sectional view on line V—V of Figure 3, and

Figure 6 is a perspective detail view.

1 denotes the vehicle frame, to the lower portion of which are secured on both sides of the central plane of symmetry A—A two supports 2 conveniently consisting of U-shaped sheet metal members. Each support 2 is reinforced inside and outside by further members 3, 4, the ends of bolts 6 being screwed into the members 2, 3, 4, said bolts retaining a saddle member 5 and a lower U-shaped stirrup.

The U-shaped stirrup is formed by a member 9 (see Figure 6) of C-shaped horizontal section, provided with upper plates 8 in which holes 7 for the bolts 6 are bored.

10 denotes the leaf unit forming a transverse leaf spring, held together by a bolt 11 positioned on the middle plane A—A.

The upper leaf 12 is shorter than the remaining leaves and is formed at the supports 2 with upper rounded portions 13. 14 and 15 denote two rubber pads interposed between the portion 13 and member 5 and between the lower spring leaf and stirrup 9, respectively.

The abovementioned members are held in position by the two bolts 6.

The ends of the leaf spring 10 are hinged by means of pivots 16 to the supports 17 for the wheels 18, forming the vertical sides of the quadrilaterals, having hinged to their upper ends upper arms 20 pivotally attached at their other end at 21 to the frame 1.

Since the abovedescribed attachments between the leaf spring and frame permit vertical movement of the wheels 18, sliding displacements between the leaves and the slight transverse displacements necessary for bending of the spring, the leaf spring 10 is deformed as shown by the dot-and-dash lines 10a, 10b, in Figure 1, which shows that the full leaf spring length between its ends attachments 16 is utilised for suspension.

The rounded portions 13 of the shorter leaf 12 react to stresses directed transversely of the vehicle, said stresses acting on the leaf 13 through the bolt 11 connecting it with the main leaves.

The stirrups 9 absorb through the rubber members arranged therein stresses directed longitudinally of the vehicle.

What I claim is:

1. In an independent wheel suspension of the type referred to including a vehicle frame, a transverse semielliptic leaf spring connecting the opposite wheel supporting members, two transversely spaced depending supports connecting said spring with the frame, and a bolt connecting the leaves of the spring at a central portion thereof, a saddle member on each depending support having a transversely curved abutment surface, a cylindrically bent portion on an upper leaf of the spring in front of said surface, and a resilient pad between said bent portion and the surface.

2. In an independent wheel suspension of the type referred to including a vehicle frame, a transverse semielliptic leaf spring connecting the opposite wheel supporting members, two transversely spaced depending supports connecting said spring with the frame, and a bolt connecting the leaves of the spring at a central portion thereof, a saddle member carried by each depending support, a transversely curved abutment surface on said saddle member, a cylindrically bent portion on an upper leaf of the spring in front of said surface, a rubber pad between said bent portion and said surface, a further U-shaped rubber pad encircling the remaining leaves of the spring in front of said bent portion of the upper leaf, and a U-shaped stirrup clamping the spring and the saddle member to the support.

3. In an independent wheel suspension of the type referred to including a vehicle frame, a transverse semielliptic leaf spring connecting the opposite wheel supporting members, two transversely spaced depending supports connecting said spring with the frame, and a bolt connecting the leaves of the spring at a central portion thereof, a saddle member carried by each depending support, a transversely curved abutment surface on said saddle member, a cylindrically bent portion on an upper leaf of the spring in front of said surface, a rubber pad between said bent portion and said surface, a further U-shaped rubber pad encircling the remaining leaves of the spring in front of said bent portion of the upper leaf, and a U-shaped stirrup clamping the spring and the saddle member to the supoprt, said stirrup having C-shaped cross section.

References Cited in the file of this patent

UNITED STATES PATENTS

| Number | Name | Date |
|---|---|---|
| 1,597,988 | Lundelius | Aug. 31, 1926 |
| 1,774,198 | Drumm | Aug. 26, 1930 |
| 2,654,597 | Barenyi | Oct. 6, 1953 |